C. C. McINTOSH.
FRUIT DRYING APPARATUS.
APPLICATION FILED SEPT. 23, 1912.
1,122,018.
Patented Dec. 22, 1914.
2 SHEETS—SHEET 1.
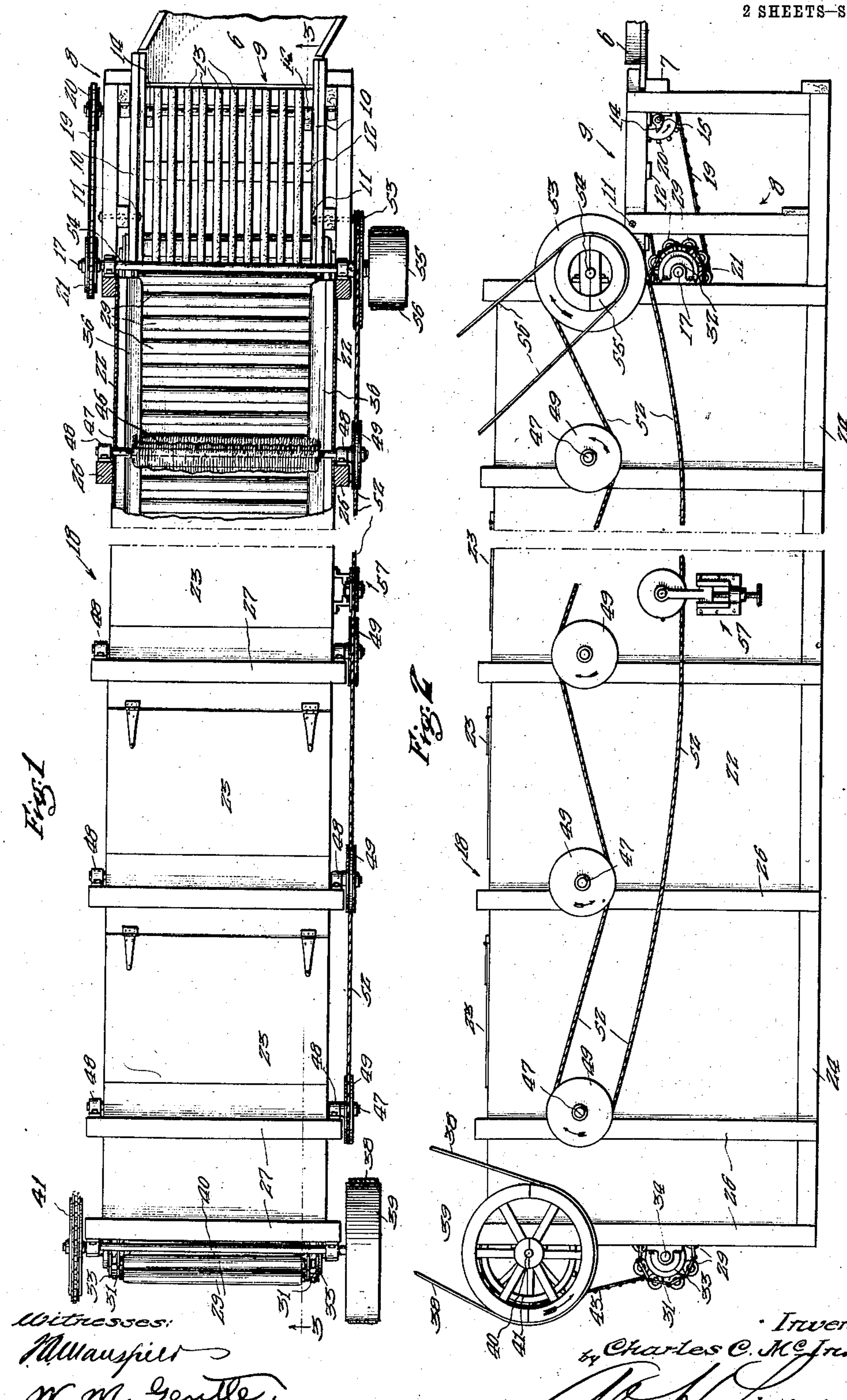
Witnesses:
M. Mansfield
W. M. Gentle.
Inventor,
Charles C. McIntosh;
by Alex H. Lidders
Attorney.

C. C. McINTOSH.
FRUIT DRYING APPARATUS.
APPLICATION FILED SEPT. 23, 1912.
1,122,018. Patented Dec. 22, 1914.
2 SHEETS—SHEET 2.
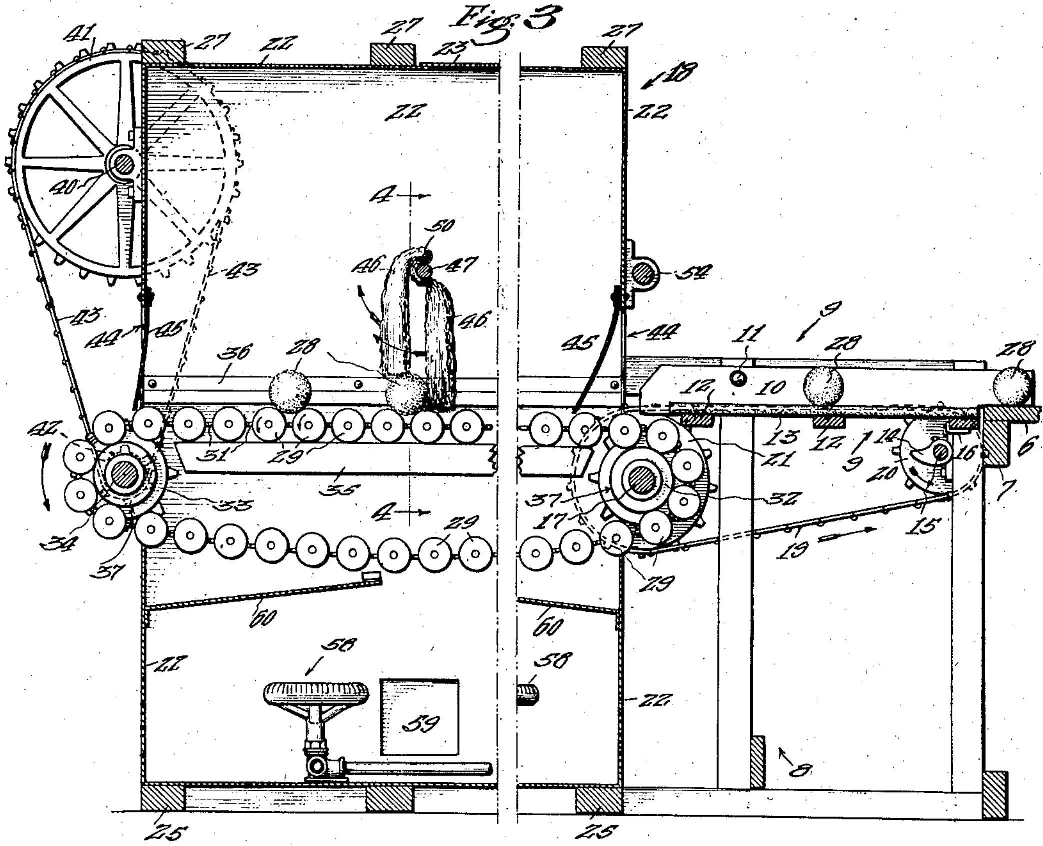
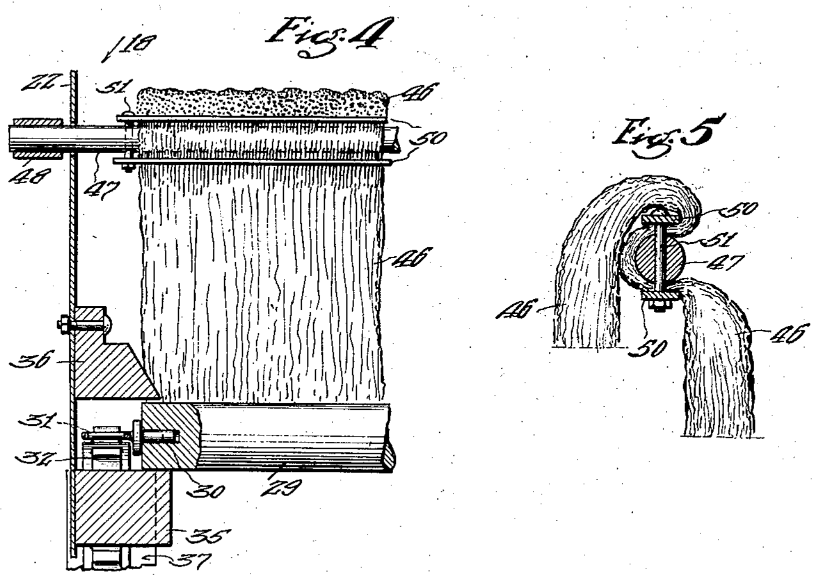
Witnesses:
M. Mansfield
W. M. Gentle
Inventor,
Charles C. McIntosh,
by Alex. H. Lidders
Attorney.

UNITED STATES PATENT OFFICE.

CHARLES C. McINTOSH, OF LOS ANGELES, CALIFORNIA, ASSIGNOR TO GEORGE D. PARKER, OF RIVERSIDE, CALIFORNIA.

FRUIT-DRYING APPARATUS.

1,122,018. Specification of Letters Patent. Patented Dec. 22, 1914.

Application filed September 23, 1912. Serial No. 721,974.

*To all whom it may concern:*

Be it known that I, CHARLES C. McINTOSH, a citizen of the United States of America, residing at Los Angeles, in the county of Los Angeles, State of California, have invented a certain new and useful Fruit-Drying Apparatus; and I do hereby declare the following to be a full, clear, and exact description of the invention, such as will enable others skilled in the art to which it appertains to make and use the same.

This invention relates to fruit-drying apparatus, and it may be said to consist in the provision of the novel and advantageous features and in the novel and improved construction, arrangement and combination of parts and devices as will be apparent from the description and claims which follow hereinafter.

One object of the invention is to provide novel and improved devices suitably arranged in the apparatus and adapted to wipe and dry the fruit.

Further objects of the invention are to provide a construction which is simple in character, economical to manufacture, install and maintain, and effective in action.

Others objects and the advantages of the invention will be aparent to those skilled in the art from a consideration of the following description of the preferred form of apparatus embodying the invention, taken in connection with the accompanying drawings in which—

Figure 1 is a partly broken and sectional plan view of the apparatus embodying the invention; Fig. 2 is a side elevation of the same; Fig. 3 is an enlarged broken sectional view taken on the line 3—3 of Fig. 1; Fig. 4 is an enlarged broken and sectional view of a portion of the apparatus taken on the line 4—4 of Fig. 3, and Fig. 5 is an enlarged partly broken and sectional view of one of the wiping devices and its mounting.

The runway 6 may have one end thereof resting on the crosspiece 7 on the upper part of the frame 8 of the feeding device 9 which latter may be of any suitable or approved construction.

As shown, the feeding device 9 may consist of side boards 10 mounted rearwardly thereof on pivots 11 on the frame 8, crosspieces 12 connected between the sideboards 10, and spaced tubes 13 of flexible material arranged on the crosspieces 12 and in parallel with the sideboards 10. The sideboards 10 at the forward end thereof may extend over and contact with the runway 6, and the feeding device 9 may be oscillated by means of the cams 14 which are mounted on the shaft 15 and adapted to intermittently contact with the wear-resisting pieces 16 on one of the cross-pieces 12 at the forward end of the feeding device. The shaft 15 may be operatively connected with the shaft 17—arranged under the rear end of the feeding device and on the forward end of the frame 18 of the fruit drier hereinafter described—by means of sprocket chain 19 passing over sprocket wheel 20 on the shaft 15 and over sprocket wheel 21 on the shaft 17.

The fruit drier may be constructed as follows: The casing 22, preferably of galvanized sheet iron, may be provided with suitable doors 23 and it may be suitably mounted on a framework consisting of longitudinal sills 24 connected together by crosspieces 25, uprights 26 suitably secured to the sills 24, and crosspieces 27 connected between the upper ends of the uprights 26. Any suitable or approved form of device may be employed for conveying the fruit 28 through the casing 22 from the feeding device 9, that shown consisting of rollers 29 which are spaced a short distance apart and pivotally mounted at the ends thereof on pins 30 carried by sprocket chains 31 which pass over sprocket wheels 32 on the shaft 17 and over sprocket wheels 33 on the shaft 34 which is suitably mounted on the uprights 26 at the rear of the drier. On the sides of the casing 22 may be suitably affixed the strips 35 which are adapted to frictionally engage the rollers to thereby turn the latter and the fruit thereon as they are moved through the casing 22; also barriers 36 may be suitably affixed on the side walls of the casing 22 to prevent the fruit 28 moving over the ends of the rollers. The shafts 17 and 34 may have suitably mounted thereon the circular guides 37 with the periphery of which the rollers 29 may contact in being moved over said shafts. The conveying device may be driven by belt 38 on the pulley 39 mounted on one end of the shaft 40 which is suitably mounted on the uprights 26 at the rear of the drier and has on its other end a sprocket wheel 41 over which and the sprocket wheel 42 on the shaft 34 passes the sprocket chain 43. The upper portion of the openings 44 through which the conveying device extends at the front and rear of the drier may be closed by flexible flaps 45 which are suitably secured to the casing 22 at the upper end of said openings.

In order to thoroughly dry the fruit 28, one or more—preferably a plurality—wiping devices are arranged in proximity to the conveying device in the casing 22 and adapted to contact with the fruit on the conveying device. The wiping device consists of suitable flexible and preferably absorbent material 46, such as cotton threads placed together, secured in a suitable manner at the upper end portion thereof to have the lower end portion thereof contact with the fruit on the conveying device. To render more effective the action of the wiping devices they may have motion imparted to them by any suitable means. As shown, they may be affixed to the shafts 47 which are mounted in bearings 48 on the uprights 26 and have on one end thereof the grooved pulleys 49. Preferably the absorbent material 46 is affixed to the shafts 47 by placing the portion of it central of its ends on said shafts and clamping it by means of strips 50 disposed on opposite sides of said shafts and secured by bolts 51 passing through said shafts as shown. In operation, it will be understood that the wiping devices act in an effective manner to thoroughly and quickly dry the fruit which results in cooling the fruit and prevents mildew and decay of the fruit. The drying and cooling results are enhanced by moving the absorbent material 46 to agitate and circulate the air in the casing 22. Movement of the absorbent material 46 may be affected by the endless rope 52 preferably passed over the pulley 53 on the shaft 54 and over the pulleys 49 to turn adjacent of the shafts 47 in opposite directions. The shaft 54 may have thereon the pulley 55 driven by belt 56, and a suitable device 57 for tensioning the rope 52 may be suitably mounted on the casing 22.

If desired, the air in the casing 22 may be heated by any suitable means, that shown consisting of one or more gas burners 58 adjacent to the doors 59 in the lower part of the casing. Baffle plates or shields 60 may be suitably affixed to the casing to be interposed between the burners 58 and the conveying device.

While one form of apparatus embodying the invention has been particularly illustrated and described, there are many changes and modifications thereof that will readily occur to those skilled in the art, wherefore, the right is reserved to all such changes and modifications as do not depart from the spirit and scope of the invention as defined in the appended claims.

I claim:

1. In fruit drying apparatus, the combination of a device for conveying fruit, and a device for drying the fruit consisting of flexible material, a shaft, means for securing to said shaft the upper end portion of the material to have the lower end portion thereof contact with the fruit, and means for rotating said shaft.

2. In fruit drying apparatus, the combination of a shaft, flexible absorbent material having a portion thereof between its ends placed on said shaft and arranged to have its end portions wipe the fruit, and means to rotate said shaft.

3. In fruit drying apparatus, the combination of a casing, a device for conveying fruit through the casing, a plurality of shafts, flexible absorbent material mounted on said shafts and arranged in the casing in proximity to the first device and adapted to wipe the fruit, and means for rotating adjacent shafts in opposite directions.

In testimony whereof, I have signed my name to this specification in the presence of two subscribing witnesses at Los Angeles, county of Los Angeles, State of California, this 16th day of September, A. D. 1912.

CHARLES C. McINTOSH.

Witnesses:

A. H. LIDDERS,

FRED A. MANSFIELD.